United States Patent [19]

Maahs et al.

[11] 4,181,790

[45] Jan. 1, 1980

[54] COPOLYMERIZATION OF ETHYLENE EMPLOYING AN ORGANIC CHLORINE COMPOUND-ACTIVATED ZIEGLER-NATTA CATALYST

[75] Inventors: Gunther Maahs; Konrad Rombusch; Wolfgang Zaar, all of Marl, Fed. Rep. of Germany

[73] Assignee: Chemische Werke Huels, Aktiengellschaft, Marl, Fed. Rep. of Germany

[21] Appl. No.: 19,066

[22] Filed: Mar. 9, 1979

[30] Foreign Application Priority Data

Mar. 10, 1978 [DE] Fed. Rep. of Germany ....... 2810396

[51] Int. Cl.² .............................................. C08F 4/76

[52] U.S. Cl. ................ 526/143; 260/33.6 A; 260/453 R; 526/141; 526/284

[58] Field of Search ........................................ 526/143

[56] References Cited

U.S. PATENT DOCUMENTS 3,645,993   2/1972   Sunseri ................................ 526/143

*Primary Examiner*—Stanford M. Levin
*Attorney, Agent, or Firm*—Millen & White

[57] ABSTRACT

Ethylene and at least one other 1-monoolefin monomer, alone or in admixture with a non-conjugated hydrocarbon diene monomer, are copolymerized in the presence of organic chlorine compound-activated Ziegler-Natta catalyst, wherein the organic chlorine compound is a hydrocarbon or a halohydrocarbon ester of up to 15 carbon atoms of 2,3,4,4-tetrachloro-3-butenoic acid.

6 Claims, No Drawings

COPOLYMERIZATION OF ETHYLENE EMPLOYING AN ORGANIC CHLORINE COMPOUND-ACTIVATED ZIEGLER-NATTA CATALYST

BACKGROUND OF THE INVENTION

This invention relates to a process for the copolymerization of olefins. More particularly, this invention relates to a process for the copolymerization of olefins conducted in the presence of Ziegler-Natta catalysts. As is well known in the art, most suitable Ziegler-Natta catalysts are combinations of vanadium compounds with alkylaluminum halides. These catalysts are soluble in inert solvents in which the polymerization reaction takes place.

One of the disadvantages associated with the use of these catalysts, however, is that a relatively high concentration of the catalyst is required because the yield of the polymer per unit amount of catalyst used is relatively low. It has been suggested to obviate this drawback by increasing the amount of the monomer and/or by increasing the pressure of the reaction. While these steps increase catalyst activity, the molecular weight of the polymers thus produced is so high that they can be processed only with difficulty. In addition, solutions of polymers of such relatively high molecular weight also have relatively high solution viscosity, so that the removal of heat during the polymerization is more difficult. Therefore, polymerization in large reaction vessels is not economically feasible.

It is also known that the polymerization yield can be increased if halogenated organic compounds are added during the polymerization reaction. These halogenated compounds are so called promoters or reactivators. Thus, French Pat. No. 1,417,195 discloses the use of trihalogenoacetic acids and particularly esters thereof, hexachloropropylene and hexachloroacetone as the promoters. French Pat. No. 1,370,358 teaches the use of hexachlorocyclopentadiene as the promoter. The disadvantage associated with the use of the heretofore known promoters is that their concentration which is necessary to increase the yield also inhibits the catalytic action ot the Ziegler-Natta catalysts.

This disadvantage was partially solved by the use of perchlorobutenoic acid compounds (German Patent Specification No. 1,595,442), made by a process of A. Roedig and P. Berneman (Liebigs Ann. Chem. 600 (1956), 1). Although it was not possible at that time to determine analytically whether the compounds were derivatives of perchlorocrotonic acid or of the isomeric perchlorovinylacetic acid, it recently has been shown that they were derivatives of perchlorovinylacetic acid.

However, such derivatives are costly. Therefore, a need still exists for an improved process for the manufacture of copolymers of ethylene, at least one other 1-monoolefin, alone, or in admixture with a non-conjugated diene.

Accordingly, it is a principal object of the present invention to provide such a polymerization process of increased reaction rate.

An additional object of this invention is to provide a process wherein the content of foreign substances and the proportion of gel in the product polymer are reduced and the cost of the process is decreased by the use of a catalyst reactivator which is less expensive than the reactivators presently available on the market.

SUMMARY OF THE INVENTION

In accordance with this invention, there is provided a process for the production of hydrocarbon copolymers of ethylene by the polymerization of an olefinic mixture of ethylene and at least one other 1-monoolefin, alone or in admixture with a non-conjugated diene, in the presence of an organic chlorine compound-activated Ziegler-Natta catalyst, wherein the organic chlorine compound is a hydrocarbon or halohydrocarbon ester of 2,3,4,4-tetrachloro-3-butenoic acid of up to 15 carbon atoms in the hydrocarbon or halohydrocarbon group. In this specification and the appended claims, the terms promoter, activator and reactivator are used to designate not only a hydrocarbon or a halohydrocarbon ester of 2,3,4,4-tetrachloro-3-butenoic acid of this invention, but also Ziegler-Natta catalyst reactivators which are known in the art.

Upon further study of the specification and appended claims, further objects and advantages of this invention will become apparent to those skilled in the art.

DETAILED DESCRIPTION

Suitable 1-monoolefins which can be copolymerized with ethylene by the process of this invention are all straight-chain and branched 1-alkenes having 3 to 16 carbon atoms. Typical representative 1-monoolefins are propene, 1-butene, 1-pentene, 1-hexene, 1-octene, 1-nonene, 1-decene and 4-methyl-1-pentene. The preferred 1-monoolefin is propylene.

Exemplary non-conjugated dienes which can also be copolymerized with ethylene and the 1-monoolefins, as set forth above, are: cis- and trans-1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, exo- and endo-dicyclopentadiene; exo: and endo-alkenylnorbornenes, such as 5-propenyl-,5-(butenyl) and 5-(2-methylbut-2'-enyl)norbornene; alkyl-alkenylnorbornenes, such as 5-methyl-6-propenyl-norbornene; alkylidenenorbornenes, such as 5-methylene-, 5-ethylidene- and 5-iso-propylidene-2-norbornene, vinylnorbornene, cyclohexenylnorbornene; alkyl-norbornadienes, such as methyl-, ethyl- and propyl-norbornadiene, or cyclodienes, such as 1,5-cyclooctadiene. 5-ethylidene-2-norbornene, cis- and trans-1,4-hexadiene and dicyclopentadiene (exo- and/or endo-) are preferred.

The unsaturated monomers set forth above (ethylene, 1-monoolefins and non-conjugated dienes) can be employed within wide percentage weight ranges. Generally, however, the polymers manufactured by the process according to this invention are either amorphous, high-molecular weight saturated copolymers, formed from 15 to 90 percent by weight, preferably 30 to 75 percent by weight, of ethylene and 85 to 10 percent by weight, preferably 70 to 25 percent by weight, of at least one other 1-monoolefin or corresponding unsaturated polymers of, in addition to ethylene and at least one other 1-monoolefin, an amount of one or more non-conjugated diene or dienes such that the unsaturated polymers contain 0.5 to 30 double bonds per 1,000 carbon atoms.

The conventional mixed Ziegler-Natta catalyst, (in the process of this invention,) contains a compound of metals of groups I to III and a compound of a metal of sub-groups IV to VI of the periodic table of the elements, generally, in molar proportion of 60:1 to 5:1 and preferably 45:1 to 10:1. The ratio of the metals of subgroups IV to VI to the monomers is 0.0001 to 0.03 atom/mole, preferably 0.001 to 0.005 g atom/mole.

Suitable compounds of the metals of groups I to III of the periodic table (Holleman-Wiberg, "Lehrbuch der anorganischem Chemie" (Textbook of Inorganic Chemistry) (1956), periodic table of the elements) are those compounds which contain at least one hydrogen atom, one alkyl group, or one aryl group bonded to the metal atom. Such compounds are, for example, amyl-sodium, butyl-lithium and diethyl-zinc. However, preferred are aluminum compounds, for example, trialkyl-, triaryl- and triaralkyl-aluminum compounds, such as trimethyl-aluminum, triethylaluminum, triisobutylaluminum, triphenylaluminum, tri-(ethylphenyl)-aluminum and mixtures thereof. In addition, alkyl aluminum halides of the general formula $AlR_nX_{3-n}$, in which X is chlorine or bromine, R is alkyl having up to 6 carbon atoms and n is 1 or 2 can also be used. Such compounds are, for example, diethylaluminum monochloride, diethylaluminum momo-bromide, ethylaluminum dichloride and ethylaluminum dibromide. Preferred are equimolar mixtures of a dialkyl-aluminum monochloride and an alkylaluminum dichloride, i.e., the alkyl-aluminum sesquichlorides. Ethylaluminum sesquichloride [$(C_2H_5)_3Al_2Cl_3$] is preferred.

Examples of suitable compounds of metals of subgroups IV to VI of the periodic table are titanium tetrachloride and chlorotitanates, such as diethyl dichlorotitanate [$Ti(OC_2H_5)_2Cl_2$]; chromium trioxide, alone or a mixture thereof with titanium compounds; chromium esters, such as chromium (III) 2-ethyl-hexanoate; and organo-tin chromates, such as bis-triphenyl-tin chromate. However, preferred are vanadium compounds and particularly vanadium compounds which are soluble in organic solvents, for example, vanadium trichloride, vanadium tetrachloride and vanadium oxychloride; and also vanadium esters, such as vanadium triacetate [$V(OOCCH_3)_3$] and vanadium triacetylacetonate [$V(C_5H_7O_2)_3$]. The preferred vanadium compound is vanadium oxytrichloride.

The reactivators or promoters used in accordance with this invention are 2,3,4,4-tetrachloro-3-butenoic acid esters of the general formula $CCl_2=CCl-CHCl-COOR$ wherein R is a hydrocarbon or a halohydrocarbon radical of up to 15 carbon atoms, e.g., straight-chain or branched chain alkyl of 1 to 15, preferably 1 to 12, and most preferably 1 to 6 carbon atoms, cycloalkyl, preferably monocyclic, of 3 to 12 carbon atoms, or aromatic carbocyclic, preferably monocyclic or dicyclic, of 6 to 14 carbon atoms, e.g., phenyl or substituted phenyl. The saturated and the unsaturated cycloalkyl radicals can optionally be substituted by one or more aliphatic straight-chain or branched chain radicals. Furthermore, R can be partially halogenated or perhalogenated, preferably, chlorinated, e.g., chlorinated or brominated with up to 6, preferably 1–4 chlorine and/or bromine atoms.

Examples of specific esters of 2,3,4,4-tetrachloro-3-butenoic acid used in accordance with this invention are methyl, ethyl, propyl isopropyl, n-butyl, sec-butyl, isobutyl, tert-butyl, n-pentyl, n-hexyl, n-heptyl, 2-methylhexyl, 2-ethyl-hexyl, n-octyl, n-nonyl, n-decyl and n-dodecyl, cyclopropyl, cyclopentyl, cyclohexyl, cyclooctyl, cyclodecyl, cyclododecyl, phenyl, o-, m- and p-cresyl, α- and β- naphthyl, 2,3,3,3-tetrachloropropyl, 2,4,4,4-tetrachlorobutyl, 3,5,5,5-tetrachloropentyl, mono-, di-, tri-, tetra- and penta-chloro- or bromo-phenyl, such as 2-chlorophenyl, 3-chlorophenyl, 4-chlorophenyl, 2,3-dichlorophenyl, 2,4-dichlorophenyl, 2,5-dichlorophenyl, 2,6-dichlorophenyl, 2,4,6-trichlorophenyl, 2,3,4,6-tetrachlorophenyl and pentachlorophenyl esters. The methyl ester and the n-butyl ester are particularly preferred.

The 2,3,4,4-tetrachloro-3-butenoic acid esters are ordinarily used in a proportion of about 5 to 250 mmols, preferably 50 to 100 mmols, per 1 mmol of the metal compound of subgroups IV to VI of the periodic table component of the catalyst. As is well known in the art, the reactivator, in this case a 2,3,4,4-tetrachloro-3-butenoic acid ester, can be added directly to the polymerization mixture along with one of the monomers, e.g., the non-conjugated diene, or along with an inert solvent as well as unsolved.

The addition of the 2,3,4,4-tetrachloro-3-butenoic acid esters causes retention of polymerization-inducing valency level of the metals of sub-groups IV to VI for a longer period of time, thereby allowing the utilization of the catalyst system to an optimum degree. The 2,3,4,4-tetrachloro-3-butenoic acid esters can be used alone or in combination with another reactivator, e.g., perchlorovinylacetic acid esters, hexachloroacetone, hexachlorocyclo-1,3-pentadiene, hexachloro-1,3-pentadiene, hexachloro-1,3-butadiene and trichloroacetic acid esters, in any amount which does not impair the beneficial effect of the 2,3,4,4-tetrachloro-3-butenoic acid esters, or the catalytic effect of the mixed Ziegler-Natta catalysts.

The 2,3,4,4-tetrachloro-3-butenoic acid esters can be prepared by processes known in the art [e.g., Liebigs Ann. Chem. 600, (1956), 1; Angew. Chem. 75, (1963), 982; and Liebigs Ann. Chem. 686, (1965), 55]. Additionally, they can also be prepared in a novel process by reacting tetra-chlorocyclobutenone, in the presence of hexachloro-1,3-butadiene, with suitable alcohols at temperatures of 125° to 200° C.

The polymerization process of this invention can be conducted in the conventional manner. Thus, the polymerization can be carried out in liquefied monomers under pressure but advantageously it is carried out in inert solvents, for example in hydrocarbons, or mixtures of hydrocarbons, which are liquid under the reaction conditions. Suitable inert solvents are butane, pentane, hexane, cyclohexane and isopropylcyclohexane, benzene fractions, such as petroleum ether, benzene, toluene or xylene, and chlorinated hydrocarbons, such as tetrachloroethylene or chlorobenzene and mixtures thereof.

As is well known in the art, it is essential that the solvents used are as free as possible from water and other H-acids compounds and from compounds which act as electron donors (e.g., Lewis bases). Such impurities, except in small amounts which in some cases are added to achieve specific desired effects, generally impair the activity of the catalyst. Suitable Lewis bases which can be employed, e.g., in amounts of up to 20 times that of the reactivator to give such desired effects, are, for example, ammonia, aniline, pyridine, quinoline, triethylamine and cyclohexylamine.

The reaction proceeds particularly smoothly if the mixed Ziegler-Natta catalysts are soluble in the solvents used or are colloidally dispersed therein.

The polymerization is generally carried out at conventional temperatures, e.g., +10° to +80° C., preferably +20° to +60° C.

The reaction proceeds at an adequate rate without the application of pressure but it can also be carried out under pressure. The polymerization, which preferably is carried out as the continuous process, is discontinued in a manner generally known, by the addition of substances containing active hydrogen, such as water, alcohols or carboxylic acids.

Working-up of the copolymers manufactured by the process according to the invention can be effected in various ways known in the art. Thus, solvents and other volatile constituents, such as residual monomer and in some cases lower oligomers, can be removed from the polymeric liquid, after deactivation of the catalyst, by distillation, for example in a rotary evaporator or a thin film evaporator. Conversely, if a solution of an elastomer is the product of the reaction, it is better to work it up by precipitation, for example with a lower alcohol, such as methanol, ethanol or isopropanol, or by removal of the solvents with steam.

Generally, the copolymers manufactured by the process according to this invention have a reduced specific viscosity (RSV value) of 0.5 to 5 dl/g, preferably 1 to 3 dl/g, and they are suitable for many commercial applications, for example, in the manufacture of water hoses, pipe sockets, foam rubber seals, car bumper pads and sheeting.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The characteristics of the product (RSV value, fraction insoluble in toluene at 90° C. and number of double bonds/1,000 carbon atoms) given in the examples were determined as follows:

(1) RSV value was determined in a 0.1 percent by weight solution of the product in p-xylene at 90° C.

(2) Fraction insoluble in toluene at 90° C., which is a measure indicative of the degree of crystallinity, was determined by heating the sample to 90° C., whereupon the entire copolymer dissolved into the solution. On cooling to 20° C., the portion indicated to be insoluble, in percent by weight, was based on the proportions of the total sample which precipitated out.

Proportion of double bonds/1,000 carbon atoms was determined by infra-red spectroscopy.

PREPARATION I

Preparation of 2,3,4,4-tetrachloro-3-butenoate according Liebigs Ann. Chem. 686 (1965), 63:

51 g (0.25 mole) of tetrachlorocyclobutenone were heated to 120° C. While maintaining this temperature, 18.5 g (0.25 mole) butanol were then added dropwise over the course of 30 minutes. The reaction mixture then was fractionally destilled under reduced pressure. Yield: 62.4 g (90% of theory) of butyl-2,3,4,4-tetrachloro-3-butenoate.

PREPARATION II

Preparation of 2,3,4,4-tetrachloro-3-butenoate according a novel process by reacting tetra-chlorocyclobutenone, in the presence of hexachloro-1,3-butadiene with an alcohol at a temperature of 125° to 200° C:

A mixture of 20.0 g (0.096 mole) of 99 percent pure tetrachlorocyclobutenone (=50 percent by weight) and 20.0 g of hexachloro-1,3-butadiene was heated to 150° C. While maintaining this temperature, 3.2 g (0.1 mole) of methanol were then added dropwise over the course of 10 minutes and the reaction mixture was stirred for an additional 60 minutes. In addition to the hexachloro-1,3-butadiene, which had remained unchanged, the reaction mixture contained 0.56 g of unconverted tetrachlorocyclobutenone and 22.6 g of methyl 2,3,4,4-tetrachloro-3-butenoate; that is, the selectivity was 94.6% of theory and the conversion was 93.4% of theory.

EXAMPLE 1

(a) Apparatus

The preparation of a copolymer of ethylene, propylene, and ethylidenenorbornene is carried out in a glass reactor with a capacity of 2 liters, charged with 1.5 liters of dry hexane. The glass reactor is equipped with a stirrer and 3 graduated dropping funnels.

Dropping funnel 1 contains a solution of 0.1 mmol of vanadium oxytrichloride ($VOCl_3$) in 1 liter of hexane, which is added dropwise in the course of 4 hours at a rate of 0.025 mmol per hour. The average concentration in the reactor, based on 7 liters of solvent, is 0.014 mmol of $VOCl_3$ per liter.

Dropping funnel 2 contains 50 mmols of ethylaluminum sesquichloride, which is added dropwise at a rate of 12.5 mmols per hour, to give a concentration thereof, based on the total batch, of 7.143 mmols per liter.

Dropping funnel 3 contains 8.4 mmols of n-butyl 2,3,4,4-tetrachloro-3-butenoate and 50 mmols of ethylidenenorbornene in 2.5 liters of hexane. When added dropwise at a rate of 2.1 or 12.5 mmols per hour, the average concentration in the reactor is 1.2 or 7.143, respectively, mmols per liter.

(b) Polymerization

Hexane solvent is saturated with ethylene/propylene mixture in a molar ratio of 1.8:0.3 for ½ hour at room temperature, with stirring. The thus-obtained solution is then heated to 30° to 35° C. and this temperature is maintained by means of a thermostat-controlled bath for a reaction time of 4 hours. During this time, the solutions of the individual catalyst components are added dropwise and ethylene/propylene is supplied at a rate of 1.8:0.3 mmols per hour.

(c) Working up

The polymer solution is run off, through a wide-bore glass tap, into a second stirred vessel which contains 100 ml of fully desalinated water and 5 g of a commercially available stabilizer (octadecyl-2,4-di-tert.-butyl-3-hydroxyphenylpropionate). 350 ml of isopropanol are added as a stopper. The polymer solution is then freed from hexane by means of steam in an apparatus customarily used for this purpose. The copolymer then contains about 50 percent by weight of water which is removed in a vacuum drying cabinet at 50° C. The yield is 265 g.

(d) Table 1 below sets forth the analytical and technical data relating to the products made according with the teaching of this example.

EXAMPLES 2 to 7 and Comparative Example A

Examples 2–7 and the comparative Example A were carried out in the apparatus described in Example 1. The polymerization reaction and the working-up of the polymer were also carried out under the conditions of Example 1. The reactivators and/or the concentration thereof were changed as specified in Tables 1 and 2. The individual catalysts and reactivators are designated as follows in the tables:

a = $VOCl_3$ b=($C_2H_5$)$_3$Al$_2$Cl$_3$
$c_1$=CCl$_2$=CCl—CHCl—COOC$_4$H$_9$
$c_2$=CCl$_2$=CCl—CCl$_2$—COOC$_4$H$_9$
$c_3$=CCl$_2$=CCl—CHCl—COO—CH$_2$—CH$_2$—CH$_2$Cl $$c_4 = CCl_2=CCl-CHCl-COO-CH_2-\underset{\underset{C_2H_5}{|}}{CH}-C_4H_9$$

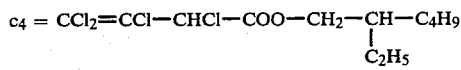

$c_6$=CCl$_2$=CCl—CHCl—COOCH$_3$

Table 1

| Example | 1 | A | 2 |
|---|---|---|---|
| Component a | 0.014 | 0.014 | 0.014 |
| (mmol/l) b | 7.143 | 7.143 | 7.143 |
| $c_1$ | 1.2 | — | 1.8 |
| $c_2$ | — | 1.2 | — |
| Yield (g) | 265 | 220 | 270 |
| RSV value (dl/g) | 2.80 | 2.55 | 1.96 |
| Propene content (%) | 34 | 34 | 34 |
| Fraction insoluble in toluene | | | |
| at 20° C. (%) | 2 | 2 | 2 |
| at 90° C. | <2 | <2 | <2 |
| Double bonds/1,000 C atoms | 10.6 | 9.4 | 10.6 |
| Crude polymer data | | | |
| ML$_{1+4}$ at 100° C. (DIN 53,523) | 125 | 124 | 79 |
| Strength (MPa) at room temperature (DIN 53,504) | 0.8 | 0.6 | 0.5 |
| Elongation (%) at room temperature (DIN 53,504) | 1,049 | 323 | 1,600 |
| Mixing data | | | |
| Vulcameter at 160° C. | | | |
| t$_{10}$ | 2.4 | 5.2 | 2.9 |
| t$_{90}$ | 12.6 | 14.1 | 10.8 |
| (DIN 53,529) | | | |
| Modulus 100% (MPa) | | | |
| (160° C., 30 minutes) | 6.0 | 4.7 | 4.0 |
| 200% (MPa) | | | |
| (160° C., 30 minutes) (DIN 53,504) | 17.2 | 13.8 | 12.1 |
| Shore A hardness | | | |
| (160° C., 30 minutes) (DIN 53,505) | 77 | 74 | 74 |
| Elasticity (%) 22° C. | 53 | 49 | 48 |
| (160° C., 30 minutes 75° C. (DIN 53,512) | 60 | 55 | 52 |

Table 2

| Example | 3 | 4 | 5 | 6 | 7 |
|---|---|---|---|---|---|
| Component a (mmol/l) | 0.014 | 0.014 | 0.014 | 0.014 | 0.014 |
| b | 7.143 | 7.143 | 7.143 | 7.143 | 7.143 |
| $c_1$ | 0.6 | — | — | — | — |
| $c_2$ | 0.6 | — | — | — | — |
| $c_3$ | — | 1.2 | — | — | — |
| $c_4$ | — | — | 1.2 | — | — |
| $c_5$ | — | — | — | 1.2 | — |
| $c_6$ | — | — | — | — | 1.2 |
| Yield (g) | 245 | 235 | 200 | 185 | 235 |
| RSV value (dl/g) | 2.39 | 2.80 | 2.62 | 3.10 | 1.87 |
| Propene content (%) | 37 | 37 | 36 | 28 | 40 |
| Fraction insoluble in toluene | | | | | |
| at 20°C. | 3 | 3 | 2 | 16 | 3 |
| at 90°C. (%) | 3 | 3 | 2 | 4 | 2 |
| Double bonds/1,000 C atoms | 6.2 | 5.8 | 6.3 | 7.7 | 4.2 |
| ML$_{1+4}$ at 100° C. (DIN 53,523) | 81 | 80 | 81 | 83 | 62 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process for the production of copolymers of ethylene by the polymerization of an olefinic mixture of ethylene and at least one other 1-monoolefin monomer, alone or in admixture with a non-conjugated hydrocarbon diene monomer, employing as the polymerization catalyst an organic chlorine compound-activated Ziegler-Natta catalyst, the improvement which comprises employing, as the organic chlorine compound, a hydrocarbon ester or halohydrocarbon ester, each of up to 15 carbon atoms in the hydrocarbon group, of 2,3,4,4-tetrachloro-3-butenoic acid.

2. A process according to claim 1 wherein the organic chlorine compound is an alkyl ester of 1 to 6 carbon atoms of 2,3,4,4-tetrachloro-3-butenoic acid.

3. A process according to claim 1, wherein the organic chlorine compound is n-butyl 2,3,4,4-tetrachloro-3-butenoate.

4. A process according to claim 1, wherein the organic chlorine compound is methyl 2,3,4,4-tetrachloro-3-butenoate.

5. A process according to claim 1, wherein the Ziegler-Natta catalyst is a mixture of ethylaluminum sesquichloride and vanadium oxytrichloride.

6. A process according to claim 1, wherein the olefinic mixture is a mixture of ethylene and propylene, wherein the catalyst is a mixture of ethylaluminum sesquichloride and vanadium oxytrichloride activated by an alkyl ester of 1 to 6 carbon atoms of 2,3,4,4-tetrachloro-3-butenoic acid.

* * * * *